G. A. HOBART.
RECORDING AND INDICATING APPARATUS.
APPLICATION FILED APR. 10, 1915.
1,147,323.
Patented July 20, 1915.
2 SHEETS—SHEET 2.
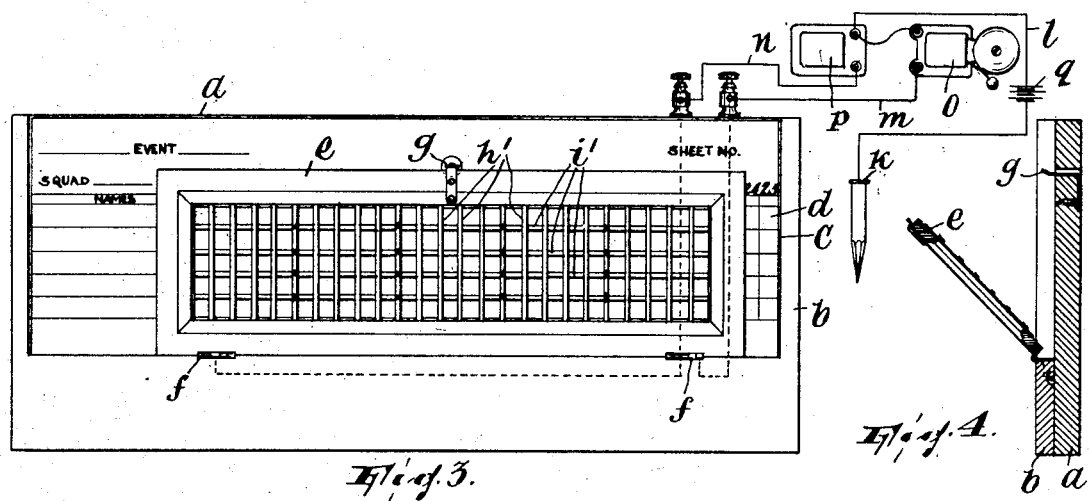
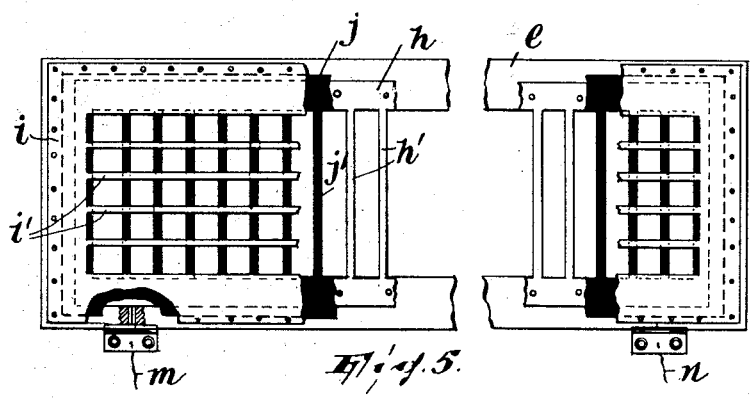
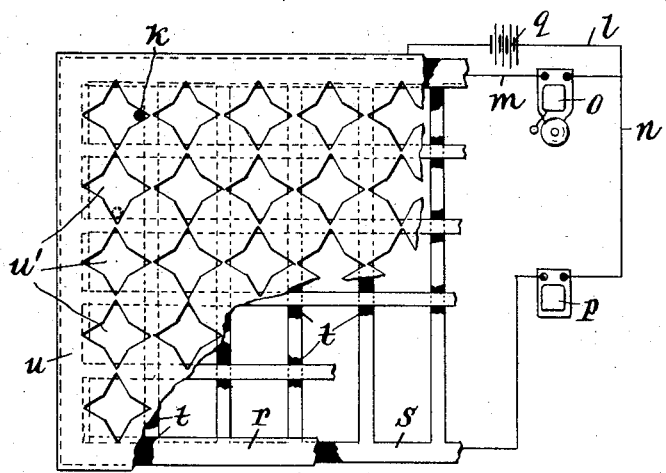
WITNESS
Wm Bell
INVENTOR,
Garret A. Hobart,
BY
John Steward,
ATTORNEY.

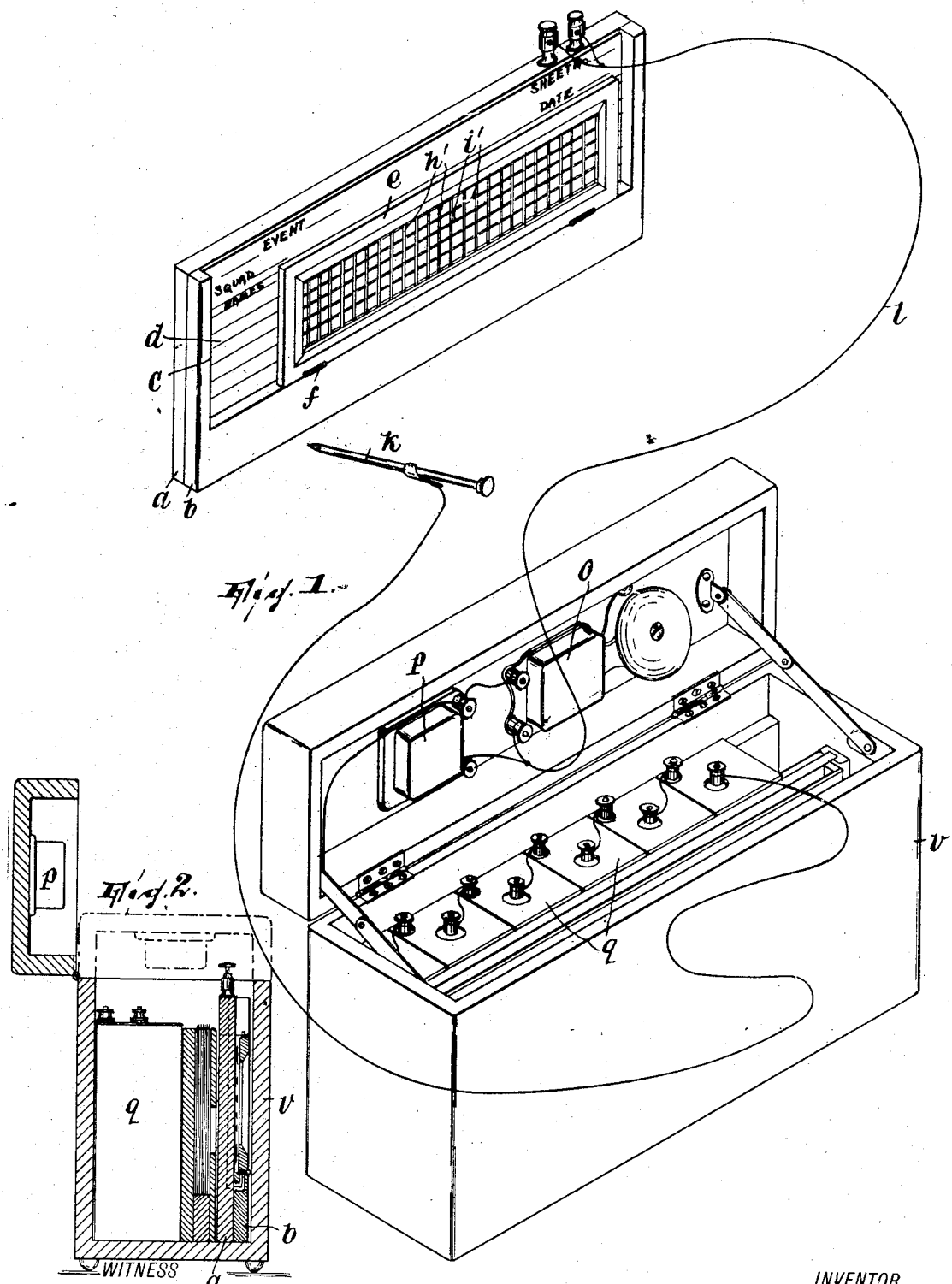

UNITED STATES PATENT OFFICE.

GARRET A. HOBART, OF PATERSON, NEW JERSEY.

RECORDING AND INDICATING APPARATUS.

1,147,323.  Specification of Letters Patent.  Patented July 20, 1915.

Application filed April 10, 1915. Serial No. 20,518.

*To all whom it may concern:*

Be it known that I, GARRET A. HOBART, a citizen of the United States, residing at Paterson, in the county of Passaic and State of New Jersey, have invented certain new and useful Improvements in Recording and Indicating Apparatuses, of which the following is a specification.

In trap shooting, the score is usually kept by one person while another indicates by a bell or otherwise the result of each shot. The members of the squad at the time a shot is made have no way of knowing that the person keeping the score or tally marks the result of the shot correctly; errors thus frequently become embodied in the record or score.

The object of this invention is to provide a simple apparatus, capable of being employed in the adaptation indicated above or otherwise, whereby one and the same operation makes the proper mark on the score sheet or other surface for the markings and indicates by a signal the character of the shot thus "scored," *i. e.*, whether it was "dead bird" or a "lost bird." With an apparatus thus devised, it will be obvious that it will be practically impossible for errors to be recorded: the marking on the score of necessity agrees with the signal given, and if a signal is incorrectly given either the member of the shooting squad who made the shot or his opponents will protest at once, so that correction of the score is possible immediately.

According to this invention, means is provided which affords the surface for the tally markings, with a tally signaling and marking means including a marking implement which when moved over the surface to mark the tally causes a signal to be actuated. In the preferred form of the invention, the second-named means includes a grid whose crossing members have signals of different significance respectively appertaining to them, and when the marking implement is moved over said surface to mark the tally it is contemplated that it be brought in contact with one of the crossing members and by such contact effect the actuation of the appropriate signal; thus, if the marking implement be moved in one direction it will contact with one of the grid members which extend one way and thus actuate one signal, thereby at once recording and by the signal indicating a "lost bird" or "dead bird," and if the marking implement be moved in the transverse direction it will contact with one of the grid members which extend the other way and thus actuate the other signal, thereby at once recording and by the signal indicating the opposite result.

In the accompanying drawings I have shown two forms of my invention, Figure 1 being a perspective view of one form thereof, the record tablet being removed from the case in which the tablet and the rest of the apparatus may be stored; Fig. 2 a vertical sectional view of the case, with the tablet in position therein; Fig. 3 a plan of the tablet and a diagram of the electric circuit; Fig. 4 a transverse sectional view of the tablet; Fig. 5 an underneath plan view, partly broken away, of the grid of the tablet; Fig. 6 a fragmentary top plan of the grid in the other form of the invention, with the wiring therefor appearing diagrammatically; and, Fig. 7 a sectional view of such grid.

The aforesaid tablet is formed as follows: $a$ is a board or plate forming the back or base thereof and $b$ a board or plate which is suitably secured thereon and has a large rectangular opening $c$ formed therein and adapted to receive, resting on the back or base board $a$, the score or tally sheet $d$, which is suitably provided with lines intersecting at right angles to form columns or rows running both vertically and horizontally and may be variously inscribed, for instance, with the names of the squad-members opposite the horizontal rows and numbers for the rounds over the vertical rows.

The aforesaid grid is adapted to be imposed upon the tally sheet when in place and at that time to have its openings register with the spaces for the markings thereon formed by the aforesaid intersecting lines. To this end, $e$ is a rectangular frame which is pivoted to the board or plate $b$ by the hinges $f$. It has a suitable catch $g$ for securing it down upon the score sheet. Attached to the underneath side of this frame are the metallic plates $h$ and $i$ formed with spaced parallel bars $h'$ and $i'$, those of one plate extending at right angles to those of the other; between these two plates is an insulating sheet $j$ having bars $j'$ which register with the bars of the plate $h$. The center-tocenter spacing of the openings in the grid thus formed is identical to that of the spaces in the tally sheet when the latter is properly gaged at the bottom and one side of the recess therefor formed in the plate $b$.

$k$ is a suitable pencil or marking device. It forms a circuit closer, being in the present instance (referring to Figs. 1 to 5) one of the terminals of an electric circuit which includes the wiring $l$ having the branches $m$, $n$, a bell $o$ and a buzzer $p$, respectively in said branches, a source of current $q$ and the plates $h$ and $i$, each of whose bars or contacts $h'$ $i'$ forms a terminal for the corresponding branch of the circuit.

In the use of the form of the apparatus now being described, a tally sheet being in place and the grid folded down thereon, each time a shot is fired by one of the squad members the recorder makes a mark on the tally sheet opposite the proper player's name and in the proper round column; if the shot was a hit the recorder makes a mark running one way (vertically or horizontally), and if it was a miss he makes a mark running the other way. Each time he makes a mark he brings his pencil against the contact afforded by the bar which crosses the direction of the marking stroke, and this closes the circuit and so actuates the appropriate signal. The signal must agree with the mark, and if there is an error it is common to both and at once apparent to the contestants.

In the construction shown in Figs. 6 and 7, the pencil is not connected physically in the circuit, but in addition to the plates $r$ and $s$, exactly the same as the plates $h$ and $i$, there is a metallic plate $u$ formed with quadrangular holes $u'$ and secured face to face with the plates $r$ $s$, the several plates $r$, $s$ and $u$ being electrically separated by the insulation $t$. This plate $u$ forms one terminal of the circuit and each of the plates $r$ $s$ (attached to the branches of the circuit) affords in its bars terminals for the circuit-branches, the same as already described in connection with Figs. 1 to 5. The holes $u'$ have their diagonals parallel with the bars of the plates $r$ $s$, and when the pencil (which is an electric conductor) is moved horizontally or vertically over the tally sheet it enters the appropriate angle of a hole $u'$ and so is guided accurately to its destination, to wit, into circuit-closing relation to plate $u$ and one of the plates $r$ $s$, thus actuating one of the signals in the same stroke that the mark is made by the pencil on the tally sheet.

The case $v$ shown in the drawings has compartments for the batteries $q$, tablet and tally sheets, and may carry on its hinged cover the bell and buzzer; thus the entire apparatus is at once intact and capable of being packed in an orderly and compact disposition.

I do not wish to be limited to any of the details of construction herein shown and described, what I claim being, 1. In combination, means affording the surface for the tally markings and a tally signaling and marking means including an open electric signal-containing circuit having one of its terminals adjacent to the part of the surface directly receiving the markings and a circuit-closing marking implement.

2. In combination, means affording the surface for a row of the tally markings and a tally signaling and marking means including an open electric signal-containing circuit having one of its terminals adjacent to and extending longitudinally of the part of said surface directly receiving the row of tally markings and a circuit-closing marking implement.

3. In combination, means affording the surface for the tally markings and a tally signaling and marking means including an open electric signal-containing circuit having one of its terminals adjacent to the part of the surface directly receiving the markings and a circuit-closing marking implement, said terminal forming a physical stop for the marking implement.

4. In combination, means affording the surface for the tally markings and a tally signaling and marking means including signals having different significance, electric circuit means having separate circuit portions respectively including the signals and having separate terminals adjacent said surface, and a circuit-closing marking implement.

5. In combination, means affording the surface for the tally markings and a tally signaling and marking means including signals having different significance, electric circuit means having separate circuit portions respectively including the signals and having separate intersecting terminals crossing said surface, and a circuit-closing marking implement.

6. In combination, means affording the surface for the tally markings and a tally signaling and marking means including signals having different significance, electric circuit means having separate circuit portions respectively including the signals and having separate grid-forming terminals crossing said surface, and a circuit-closing marking implement.

7. In combination, means affording the surface for the tally markings, and a tally signaling and marking means including a signaling and marking means arranged substantially face to face with grid arranged substantially face to face with the first means, signals of different significance respectively appertaining to the sets of crossing members of the grid, means to transmit actuation from each set of said members to the corresponding signal, and a signal-controlling and marking implement adapted to engage one of said members on each marking stroke.

8. In combination, a gaging support for the ruled tally sheet, and a tally signaling and marking means including a grid movable into and out of a definite overlying position with reference to the gaged sheet, signals of different significance respectively appertaining to the sets of crossing members of the grid, means to transmit actuation from each set of said members to the corresponding signal, and a signal-controlling and marking implement adapted to engage one of said members on each marking stroke.

9. In combination, means affording the surface for the tally markings, a signal, and means to actuate the signal and mark the tally on said surface including a marking implement and spaced contacts arranged adjacent to the marking surface and affording limits to the marking movements of said implement.

In testimony whereof I affix my signature.

GARRET A. HOBART.